Figure 8:
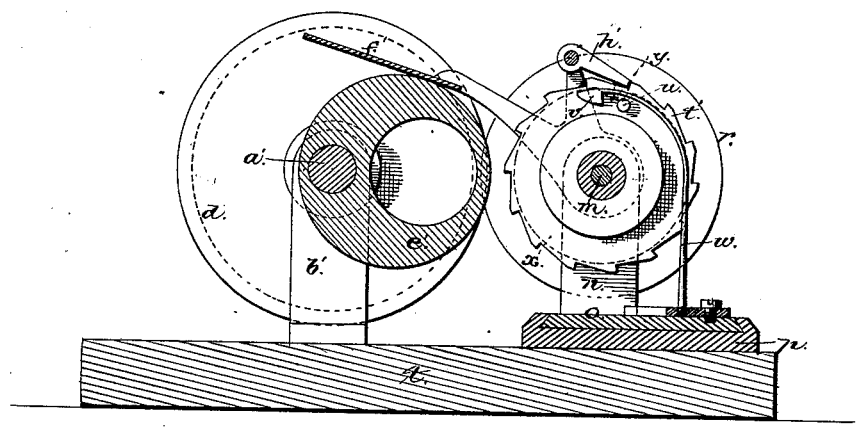

2 Sheets—Sheet 1.
W. W. DUTCHER.
Temple-Roller Drilling-Machines.
No. 197,210. Patented Nov. 20, 1877.
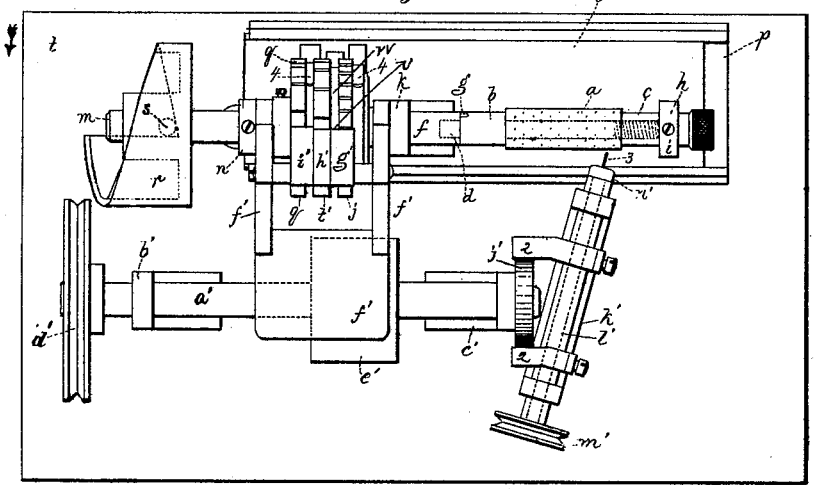
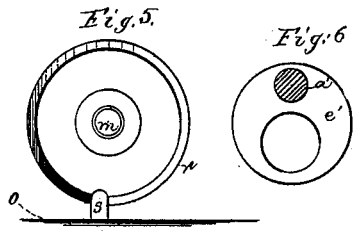
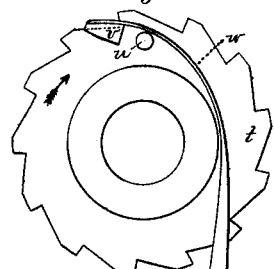
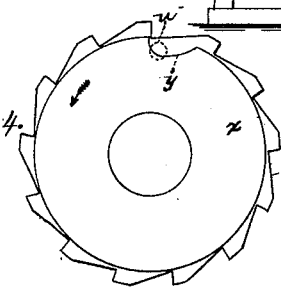
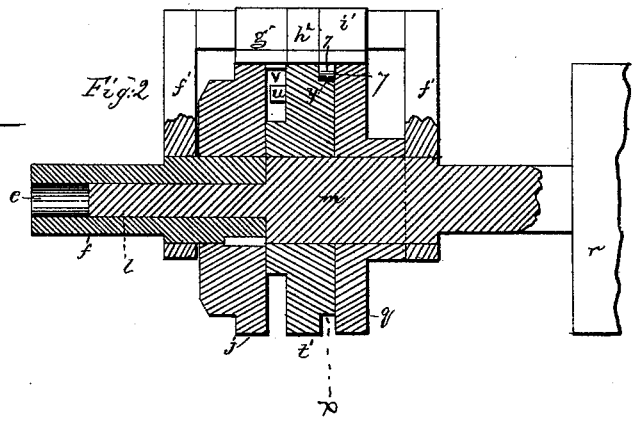
Witnesses.
L. H. Latimer.
E. C. Perkins.
Inventor.
Warren W. Dutcher
per Crosby Gregory attys.

UNITED STATES PATENT OFFICE.

WARREN W. DUTCHER, OF HOPEDALE, MASSACHUSETTS, ASSIGNOR TO DUTCHER TEMPLE COMPANY, OF SAME PLACE.

IMPROVEMENT IN TEMPLE-ROLLER-DRILLING MACHINES.

Specification forming part of Letters Patent No. 197,210, dated November 20, 1877; application filed May 12, 1877.

*To all whom it may concern:*

Be it known that I, WARREN W. DUTCHER, of Hopedale, in the county of Worcester and State of Massachusetts, have invented an Improvement in Mechanism for Drilling Temple-Rollers, of which the following is a specification:

This invention relates to mechanism for drilling holes in temple-rollers for the insertion of the temple-teeth.

The machine contains a rotating roller-carrying shaft to revolve the roller axially, and this shaft and roller are intermittingly moved longitudinally to place the roller with relation to the drill or drills, so as to drill holes therein for the reception of the teeth.

This invention consists, primarily, in the combination, with mechanism to drill holes in temple-rollers, of mechanism to automatically change the relative position of roller and drill to form holes in the roller for the reception of the teeth.

Figure 1 represents, in plan view, sufficient portions of a machine to drill temple-rollers to delineate my invention; Fig. 2, a partial section taken through the ratchets and shafts supporting them, looking in the direction of the arrow in Fig. 1; Figs. 3 and 4, opposite side elevations of the pawl-controlling ratchet-cam to regulate the extent and times of rotation of the adjacent ratchets and the shafts to which they are attached. Fig. 5 is an end view of one form of cam to move the temple-roll longitudinally; Fig. 6, a detail of the cam for moving the pawls; and Fig. 7, a side view of one pawl, $i'$. Fig. 8 is a transverse section.

The temple-roller $a$, made as a wooden shell, is placed on the roller-holder, consisting of a shaft, $b$, (shown in Fig. 1 in full and dotted lines,) and then the elongated nut $c$ is screwed upon the end of the shaft, thereby confining the roller on the holder. At one end the shaft $b$ has a stud, $d$, to enter a hole, $e$, in the shaft $f$, adapted to rotate the temple-roller. This shaft $f$ has at one end a pin, $g$, (see dotted lines, Fig. 1,) to enter the shaft $b$, to insure the rotation of the shafts $b$ and $f$ in unison.

It is obvious that the portion $d$ of the shaft $b$ might be made square, or of other than circular form, and be fitted to a hole of similar shape in shaft $f$. The end of shaft $b$ might be hollow to receive a projection like $d$, it extending from the shaft $f$.

The elongated nut $c$ is provided with an annular groove to receive the end of a screw, $h$, in the bearing $i$ that receives and within which the nut rotates. The screw $h$, entering the annular groove, permits the nut to rotate, but prevents it from moving longitudinally. The shaft $f$, in this instance made tubular, has attached to it a ratchet-wheel, $j$, provided with teeth double the number of holes in each annular series of holes in the temple-roller. This shaft rests in a bearing, $k$, and receives within it the end $l$ of shaft $m$, it in turn resting in bearings $n$. All the bearings, $i$ $k$ $n$, are fixed upon a sliding frame, $o$, fitted in a guideway, $p$. The shaft $m$, suitably held so that it can only rotate in its bearing $n$, has attached to it a ratchet-wheel, $q$, having its teeth so spaced with reference to the shape of the cam $r$ as to move the latter at suitable times a distance sufficient to properly space the holes from end to end of the roller.

In this instance of my invention, this cam $r$ is made a cylindrical shell, with its face inclined like a screw, such face resting against a fixed pin, $s$, on the bed $t$.

It is obvious that this cam might be on a fixed shaft, and be made to operate against the end of shaft $m$; or instead of this cam I might employ any other usual form of scroll-cam, or well-known equivalent, to traverse a rotating shaft longitudinally.

Between the two ratchets $j$ $q$, and loose on shaft $m$, is a pawl-controlling ratchet-cam, $t'$, having at one side a pin, $u$, to act upon the inclined end $v$ of a spring-finger, $w$, attached to the slide $o$, and located, in this instance, between the two ratchets $j$ $t'$. At its opposite side this ratchet $t'$ has a hub, $x$, provided on its periphery with a depression, $y$. (See Fig. 4.) The shaft $a'$, mounted in bearings $b'$ $c'$, and driven in any suitable way, (in this instance by a belt on pulley $d'$,) has attached to it a pawl-moving cam, $e'$, adapted to move the pawl-carrying lever $f'$, having the pawls $g'$ $h'$ $i'$, each adapted to move its own ratchet $j$ $t$ $q$ at the proper time. The shaft $a'$ has also an eccentric, $j'$, adapted to operate upon lugs 2 2, connected with a tubular sleeve, $k'$, containing the drill-shaft $l'$. (Shown in dotted lines.) This drill-shaft is provided with a proper driving-pulley, $m'$, and a holder, $n'$, for the drill 3. This eccentric $j'$ moves the sleeve and drill longitudinally, so as to project it into and withdraw it from the roller at the proper times. Each ratchet $j\ t'$ is provided with a friction device, 4, to hold the said ratchets against slip.

In operation the pawl $g'$ engages the ratchet $j$, and rotates the roller-carrying shaft $f$ and roller a distance sufficient to move the roller far enough to space the holes extending annularly about the roller. The teeth of ratchet $j$ are of such size, and the pawl has such movement, that it engages each alternate tooth. After each annular series of holes is bored, and just as the roller is to be moved longitudinally, the pin $u$ meets the end $v$ of the spring $w$, which lifts the pawl, and so controls it that at such time the pawl moves the ratchet but one tooth. This allows the holes of the next annular series to be made at the side of the last series of holes, but in places opposite the centers of the spaces between the holes of the last annular series of holes drilled. This lost axial motion enables the holes to be placed closely together. When the recess $y$ comes under the pawl $i'$ its projection 7 enters it, and then only the pawl engages the ratchet and moves it one space, this movement turning the cam $r$, and moving the slide $o$, and shafts, ratchets, and roller longitudinally.

It is obvious that the drill might be moved from end to end of the roller, instead of moving the roller longitudinally, and more than one drill may be operated simultaneously.

The drill is made to drill holes at an inclination to the axis of the cylinder, so as to incline the pins toward one end of each roller.

Instead of revolving the roller and then moving it longitudinally, the roller may be moved longitudinally to drill a row of holes from end to end thereof, and then be partially rotated and moved longitudinally to drill a second row of holes parallel with those previously bored; or, by combining the rotary and longitudinal motions of the roller, the holes may be drilled spirally.

I claim—

1. The combination, with a drill to drill holes in a temple-roller, of mechanism to change the relative positions of the drill and roller, to drill holes in the periphery of the temple-roller, substantially as described.

2. The combination, with a rotating temple-roller-carrying shaft, of a drill to drill holes in such roller, substantially as described.

3. In a machine for drilling holes in temple-rollers, a drill and a rotating roller-carrying shaft, in combination with a mechanism to move the shaft and roller longitudinally, substantially as described.

4. The combination, with the roller-carrying shaft and mechanism to rotate it, of mechanism to control the pawl that moves the ratchet and shaft, to cause it to change the extent of rotation of the shaft just as each succeeding series of holes is to be drilled, to space the holes of each series, substantially as described.

5. The combination, with the ratchets $j$ and $q$ and their pawls, of a pawl-controlling ratchet, to lift and lower the pawls to operate the ratchets $j\ q$ at the proper times, substantially as described.

6. The slide $o$ and shafts $f\ m$, and their ratchets and pawls, in combination with a cam to move such shafts, ratchets, and temple-roller longitudinally, substantially as described.

In testimony whereof I have signed my name to this specification in the presence of two subscribing witnesses.

WARREN W. DUTCHER.

Witnesses:
   F. J. DUTCHER,
   W. S. BANCROFT.